US006898378B1

(12) United States Patent
Nelson et al.

(10) Patent No.: US 6,898,378 B1
(45) Date of Patent: May 24, 2005

(54) SHOCK-RESISTANT BACKPLANE UTILIZING INFRARED COMMUNICATION SCHEME WITH ELECTRICAL INTERFACE FOR EMBEDDED SYSTEMS

(75) Inventors: Shannon M. Nelson, Chicago, IL (US); Stuart J. Collar, Algonquin, IL (US); Mark D. Hischke, Algonquin, IL (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/534,880

(22) Filed: Mar. 24, 2000

(51) Int. Cl.[7] .............................................. H04B 10/00
(52) U.S. Cl. ...................... 398/138; 398/115; 398/116; 398/117; 398/135
(58) Field of Search ................................ 359/152, 154, 359/159, 163, 142; 398/135, 138–139, 115–117

(56) References Cited

U.S. PATENT DOCUMENTS

| | | | |
|---|---|---|---|
| 4,331,952 A | | 5/1982 | Galvin et al. |
| 4,527,285 A | * | 7/1985 | Kekas et al. ................. 455/607 |
| 4,785,465 A | * | 11/1988 | Lang et al. ..................... 375/7 |
| 5,161,152 A | | 11/1992 | Czerwiec et al. |
| 5,241,410 A | | 8/1993 | Streck et al. |
| 5,267,070 A | * | 11/1993 | Stewart et al. ............... 359/141 |
| 5,323,256 A | | 6/1994 | Banks |
| 5,349,461 A | * | 9/1994 | Huynh et al. ................ 359/152 |
| 5,408,217 A | | 4/1995 | Sanderford, Jr. |
| 5,441,043 A | | 8/1995 | Wood et al. |
| 5,508,836 A | | 4/1996 | DeCaro et al. |
| 5,528,409 A | * | 6/1996 | Cucci et al. ................. 359/171 |
| 5,553,629 A | | 9/1996 | Keipert et al. |
| 5,557,634 A | | 9/1996 | Balasubramanian et al. |
| 5,617,236 A | | 4/1997 | Wang et al. |
| 5,682,476 A | | 10/1997 | Tapperson et al. |
| 5,702,345 A | | 12/1997 | Wood et al. |
| 5,729,535 A | * | 3/1998 | Rostoker et al. ............. 370/328 |
| 5,737,690 A | | 4/1998 | Gutman |
| 5,774,744 A | * | 6/1998 | Story et al. .................... 710/27 |
| 5,786,921 A | | 7/1998 | Wang et al. |
| 5,787,015 A | | 7/1998 | Aldridge et al. |
| 5,794,164 A | | 8/1998 | Beckert et al. |
| 5,822,548 A | | 10/1998 | Story et al. |
| 5,828,864 A | * | 10/1998 | Danknick et al. ............. 703/24 |
| 5,850,189 A | | 12/1998 | Sakanaka et al. |
| 5,887,145 A | * | 3/1999 | Harari et al. ................ 710/301 |
| 5,903,373 A | * | 5/1999 | Welch et al. ................ 359/152 |
| 5,940,510 A | * | 8/1999 | Curry et al. ................... 705/65 |
| 5,959,287 A | * | 9/1999 | Myers et al. ............ 235/472.02 |
| 5,986,785 A | * | 11/1999 | Kobayashi .................. 359/152 |
| 5,991,639 A | * | 11/1999 | Rautiola et al. ............. 455/553 |
| 6,148,261 A | * | 11/2000 | Obradovich et al. ......... 701/208 |
| 6,335,812 B1 | * | 1/2002 | Matsubara et al. .......... 359/174 |

* cited by examiner

Primary Examiner—M. R. Sedighian
(74) Attorney, Agent, or Firm—Stetina Brunda, Garred & Brucker

(57) ABSTRACT

Infrared communications scheme for use in an embedded system. According to a preferred embodiment, the invention comprises the use of an infrared communications scheme, according to IrDA protocol, which is utilized to transmit and receive data via an electrical interface between circuit cards housed within an enclosed, embedded system. Preferably, each respective circuit card is provided with a digital tri-stateable transmitter element and a digital receiver to respectively transmit and receive data. The systems and methods of the present invention provide increased reliability than prior-art systems and methods.

20 Claims, 3 Drawing Sheets

SHOCK-RESISTANT BACKPLANE UTILIZING INFRARED COMMUNICATION SCHEME WITH ELECTRICAL INTERFACE FOR EMBEDDED SYSTEMS

STATEMENT OF GOVERNMENT RIGHTS

This invention was made with Government Support under contract N66001-98-C-8518 awarded by the United States Navy. The Government has certain rights in this invention.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

Embedded or enclosed systems for housing electronic components, such as a computer chassis, that are designed to withstand high shock and vibration are well-known in the art. Exemplary of such prior-art enclosures include those environmental enclosures disclosed in U.S. Pat. Nos. 5,309,315 and 5,570,270, issued on May 3, 1994 and Oct. 29, 1996, respectively, to Nadell et al., entitled SEVERE ENVIRONMENT ENCLOSURE WITH THERMAL HEAT SINK AND EMI PROTECTION, the teachings of which are expressly incorporated herein by reference. Additionally exemplary of such prior-art apparatus include those enclosures disclosed in U.S. Pat. No. 5,381,314 issued on Jan. 10, 1995 to Rudy, Jr. et al., entitled HEAT DISSIPATING EMI/RFI PROTECTIVE FUNCTION BOX, the teachings of which are likewise incorporated herein by reference.

In this regard, such devices are typically designed to house computer systems for use in predominantly embedded applications in severe environments. With respect to the latter, it is well-recognized in the art that a severe environment is generally defined as one subject to large environmental extremes due to temperature, humidity, radiation, electromagnetic induction, shock and vibration. Additionally, an embedded application is generally accepted as meaning a specific function or functions, which are contained within a larger application, and requires no human intervention beyond supplying power to the computer. Exemplary of such embedded applications include systems and process controls, communications, navigations, and surveillance.

In order to properly function and perform such applications, it is critical that the computer and other electronic components housed within such enclosures be constructed, supported and enclosed in such a way as to be able to withstand such severe conditions. Along these lines, the primary focus of such prior-art enclosures is to provide a structurally sound enclosure for an array of individual circuit boards or daughter cards in a backplane assembly to which the circuit boards are electrically connectable and disconnectable, to thus define a card cage.

Despite the best efforts that can be made with respect to properly arranging such circuit cards, however, an inherent problem in all such embedded systems arises from the use of wiring between circuit cards, which is necessary to interconnect such circuit cards for data transfer. Specifically, hard-wired connections are known to become disconnected when subjected to extremes in shock and vibration. In addition, because most prior art backplanes incorporate the use of a plurality of pins to transmit data between modules, there is thus increased the potential for electrical connections to disconnect after repeated impact. Also, the use of a plurality of pins can lead to an increase in energy consumed.

As such, there is a substantial need in the art for a system and method for operatively interconnecting a plurality of circuit cards with one another within an embedded system that can withstand severe environments to a greater degree than prior art system and methods. Likewise, there is a substantial need in the art for such systems and methods that can produce greater reliability, can be implemented utilizing existing technology, and allows for substantially more simplified circuitry design than prior art systems and methods.

BRIEF SUMMARY OF THE INVENTION

The present invention specifically addresses and alleviates the above-identified deficiencies in the art. In this regard, the present invention is directed to systems and methods for interconnecting a plurality of modules, namely circuit boards or daughter cards, in an embedded environment that have increased reliability, can withstand shock and vibration, and provide greater electrical isolation between such modules than prior art methods and systems.

In a preferred embodiment, the system comprises the use of a standardized infrared communication scheme, and in particular one or more schemes developed by the Infrared Data Association, or IrDA, having an electrical interface to transmit and receive data between modules. In this regard, each respective one of the plurality of modules comprising an embedded computer system is provided with an IrDA electrical interface to transmit and receive signals to thus provide a connection between such modules.

Using an electrical interface implementation of IrDA provides for more secure interconnection between modules than prior art hard-wiring techniques, and further increases reliability by providing greater redundancy (i.e., increasing the number of conductors used and available for transmitting the same data over multiple wires). The IrDA with an electrical interface additionally provides for more secure interconnection than conventional IrDA schemes by eliminating the need for line-of-sight necessary for signals to be properly transported from a transmitter, typically an LED, to a receiver, the latter typically a photodiode. The electrical interface further minimizes power consumption by eliminating both the photodiode transceiver and LED components typically incorporated in most conventional IrDA schemes. Moreover, by utilizing infrared communication schemes, the systems and methods of the present invention can transmit data at high speed, which are currently known in the art to function at 4 Mbps, and may eventually exceed 16 Mbps.

It is therefore an object of the present invention to provide a system and method for electrically interconnecting a plurality of circuit cards with one another within an embedded system that can withstand severe environments to a greater degree than prior art system and methods.

Another object of the present invention is to provide a system and method for operatively interconnecting a plurality of circuit cards with one another with an embedded system that, in addition to being able to withstand severe environmental conditions, further minimizes power consumption.

Another object of the present invention is to provide a system and method for operatively interconnecting a plurality of circuit cards with one another within an embedded system that has greater reliability than prior-art systems and methods, particularly with respect to performing data transfer functions.

Another object of the present invention is to provide a system and method for operatively interconnecting a plurality of circuit cards with one another within an embedded system that are operative to facilitate high speed communication between system modules or circuit cards contained within such system.

Still further objects of the present invention are to provide a system and method for operatively interconnecting a plurality of circuit cards with one another within an embedded system that is of simple and durable construction, relatively inexpensive to design and fabricate, may be readily designed and implemented using conventional technology, and is more effective and efficient than prior art systems and methods.

BRIEF DESCRIPTION OF THE SEVERAL VIEWS OF THE DRAWING

These, as well as other features of the present invention, will become more apparent upon reference to the drawings, wherein.

DETAILED DESCRIPTION OF THE PRESENT EMBODIMENT

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
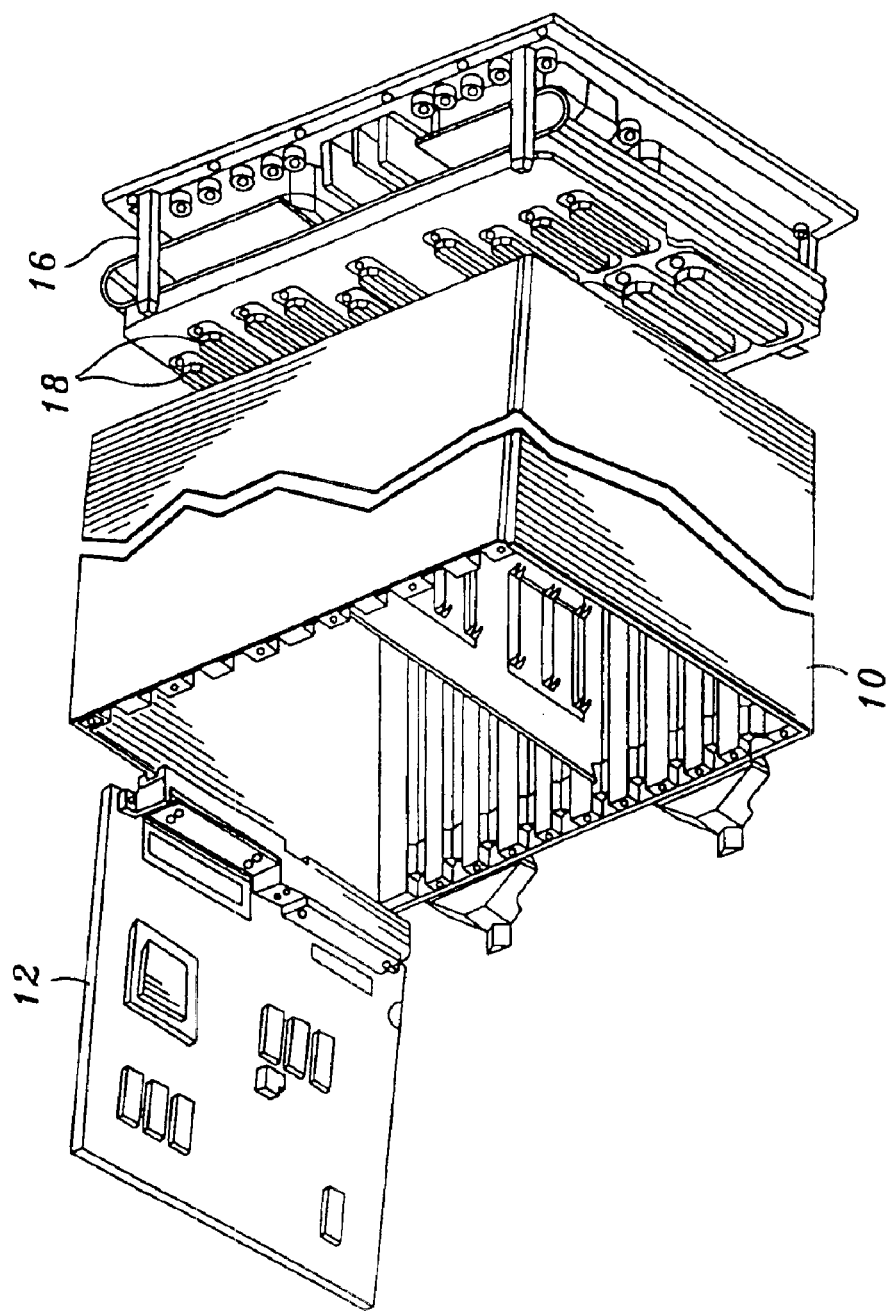
FIG. 1 is an exploded view of an enclosure depicting a circuit card positionable therewithin.

Referring now to the figures, initially to FIG. 1, there is shown an exploded view of an environment enclosure 10 for housing a computer system for use in running embedded applications in severe environments. As is well-known to those skilled in the art, such enclosures 10 are capable of withstanding extreme environmental conditions, such as maximum extremes of shock, vibration, temperature, EMI, humidity, as well as sand, dust, and the like. Such containers are particularly effective in running embedded applications, which are defined as a specific function which is contained within a larger application requiring no human intervention beyond supplying power to the computer (not shown) housed therewithin. For example, embedded applications include but are not limited to, systems and process control, communications, navigation, and surveillance.

The computer systems utilized to run such applications typically comprise a plurality of circuit boards or daughter cards, such as 12, that are affixed about a backplane 16 rigidly mounted within the enclosure. In this respect, the backplane is provided with a plurality of connectors 18 for supporting a plurality of circuit cards in a generally parallel, upright relationship. The backplane 16 also supports the power supply (not shown), which is typically located within such enclosure 10, to thus provide power for the computer system to function.

In prior art systems, the circuit cards are typically hard wired to one another, typically through a large number of conductors or pins, to enable data to be transmitted and received therebetween. The use of hard-wire electric connections, however, is known to have several drawbacks. In this regard, hard wiring is known to be unreliable, particularly when subjected to severe shock and vibration insofar as such forces cause the wire connections between circuit cards to break.

To address such problems, there is provided herein a novel communications scheme by which circuit cards can be interconnected to one another to transmit and receive data that eliminates the foregoing drawbacks. In this respect, there is provided herein an infrared communications scheme utilizing an electrical interface that interconnects the plurality of circuit cards of an embedded computer system to thus enable data to be received and transmitted therebetween. In this respect, each respective one of the plurality of the circuit cards is provided with a dedicated pair of buffered digital transceivers electrically connected to one another that enable data signals to be transmitted and received therebetween.

Figure 2:
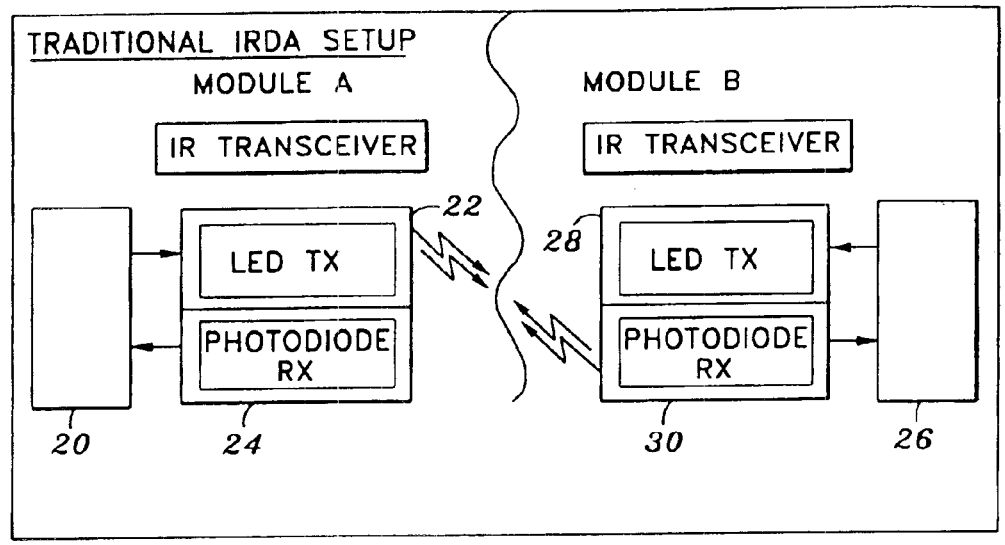
FIG. 2 depicts a traditional IrDA setup that enables data to be transmitted and received between two modules via a transmission medium of air.

The infrared communications scheme utilized in the present invention may take any of a variety of the standard infrared protocols developed by the Infrared Data Association, also known as IrDA. As is well-known to those skilled in the art, the IrDA has created interoperable, low-cost infrared data interconnection standards that support a broad range of applications for use in computing and communications devices. A traditional IrDA setup is depicted in FIG. 2 which, in simplified form, illustrates the ability to transmit and receive data between modules, via an air medium. As illustrated, a first module A, referred to as 20, is provided with an LED 22 for transmitting optical signals and a photodiode 24 for receiving optical signals. A second module B, referred to as 26, is provided that likewise has an LED 28 and photodiode 30 formed thereon. As is well known, the LED's and photodiodes respectively formed on each module enable data to be transmitted optically.

Advantageously, IrDA standards are ideally recommended for high speed, short range, line of sight, point-to-point cordless data transfer, which are typically utilized in a widespread commercial applications for personal computers, digital cameras, hand-held data collection devices, and the like. A more detailed outline of the standards and protocols designed and developed by the IrDA may be obtained from the Infrared Data Association based in Walnut Creek, Calif. Alternatively, such data may be obtained via the IrDA's website at http:\\www.irda.org\standards \standards.asp, the teachings of which are expressly incorporated herein by reference.

As will be appreciated by those skilled in the art, the use of standardized IrDA infrared communications schemes currently can enable data to be received and transmitted at rates up to four megabytes per second (4 Mbps), which is substantially equivalent, if not faster, than conventional hard-wired systems. It is further contemplated that developments may soon be made which can support data transfer rates in excess of sixteen megabytes per second (16 Mbps).

As will further be appreciated by those skilled in the art, likewise the infrared communications schemes developed by IrDA enable data to likewise be transmitted and received via an electrical interface. As will be appreciated by those skilled in the art, the electrical interface eliminates the need for line-of-sight alignment between LED and photodiodes particularly utilized in IrDA schemes, and likewise minimizes power consumption, which are known to be high in conventional IrDA schemes when transmitting signals via LED transmitters.

Because of the single wire connections utilized, the electrical interface implementation of IrDA allows a redundancy of connections which may thus be utilized to transmit the same data over multiple configurations, discussed more fully below. As such, due to the increased probability or the chance of a correct transmission, the IrDA electrical interface implementation will have substantially increased reliability as compared to conventional single line hard-wire connections, which are known to deteriorate and eventually become disconnected when subjected to high shock or vibrational activity.

Given the widespread availability of IrDA standards and protocols, it will be readily appreciated by those skilled in the art that a variety of infrared communication schemes and the ability to electrically interface the same are already commercially available that may be implemented to facilitate the transfer of data amongst circuit cards. As such, one skilled in the art would easily be able to pick and choose which particular IrDA infrared communication scheme may be appropriate for a given application.

Figure 3:
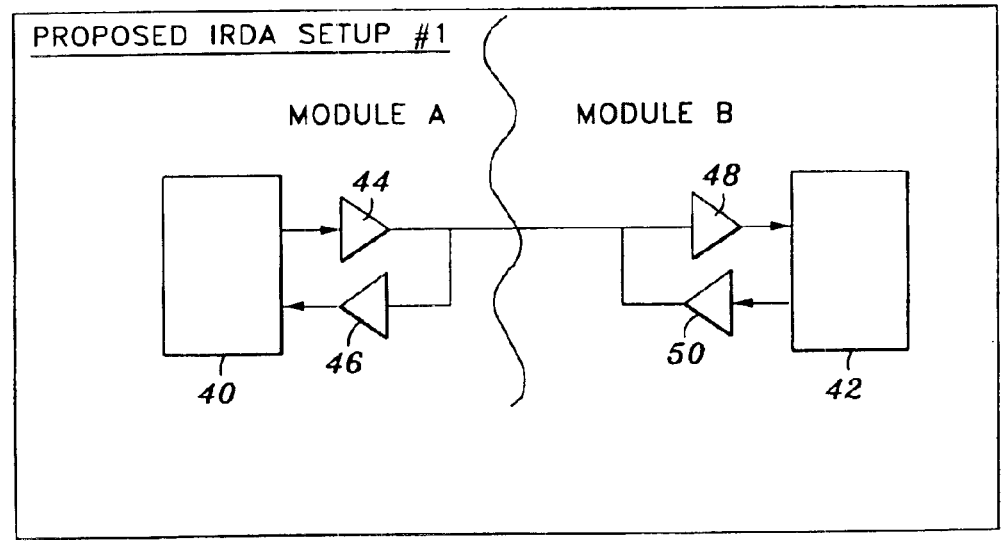
FIG. 3 is block diagram of a proposed electrical interface implementation of IrDA between two respective modules of an embedded computer system that enables data to be transmitted and received therebetween.

FIG. 3 depicts an example of how one such possible physical implementation of an IrDA infrared communications scheme may be implemented according to a preferred embodiment of the present invention. As illustrated, first and second modules 40, 42 representing circuit boards, daughter cards, and the like, having dedicated pairs of digital transceiver 44, 46, and 48, 50 formed thereon that are electrically interfaced to one another such that each respective digital transceiver pair 44, 46, and 48, 50 is operative to transmit and receive data from one module to another.

Figure 4:
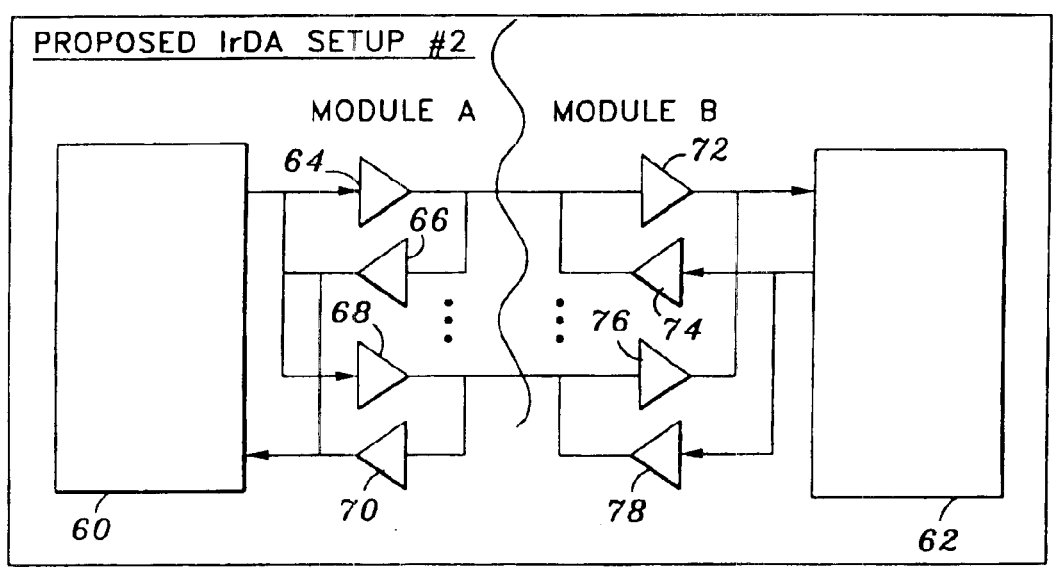
FIG. 4 is a block diagram of a second proposed electrical interface implementation of IrDA between two respective modules of an embedded computer system that enables data to be transmitted and received therebetween.

FIG. 4 depicts a second example of how an IrDA electrical interface may be implemented according to a preferred embodiment of the present invention. As illustrated, first and second modules 60, 62 representing circuit boards are provided that each include two output-transmitting tri-stateable digital buffers, 64 and 68 on first module 60, and 74, 78 of second module 62, and two input or digital receivers 66 and 70 on first module, and 72 and 76 on second module 62. The respective pairs of buffers and receivers 64, 66, and 68, 70 on first module 60 and 72, 74, and 76, 78 on second module 62, are arranged such that each respective output or transmitter element is electrically interconnected to a respective input or receiver element formed on the respective other module.

Control is invoked over each transmitter element pair 44, 50 or 64, 74 or 68, 78 such that they are prevented from transmitting simultaneously and thus contending for access to the same physical line. This control is implemented via the tri-state control input on each transmitter element. The media access control logic inherent to the IrDA protocol handles collision detection and trys on a given data line.

By so arranging the transmitting and receiving elements in the manner shown, at least two connections are established through which data may be transmitted and received between modules 60, 62. As such, to the extent a given connection between a respective transmitter element for example 64 on first module 60, to receiver 72 on second module 62 becomes disconnected or is otherwise not operative, there is yet a second link, defined by transmitter element 68 of first module 60 to receiver element 74 of second module 62, which can be utilized to transmit the same data. As will be appreciated by those skilled in the art, by providing such redundancy of interconnections, there is thus provided a higher degree of reliability insofar as interconnection between modules is not dependant upon a single connection. Likewise, because conventional hard-wiring systems already taken into account numerous conductors, typically formed as pin-type connections, is currently believed that the electrical interface implementation of IrDA would, at a minimum, be equivalent to prior art hard-wire connections, and thus would not be spatially inhibiting.

It is to be further understood that various additions, deletions, modifications and alterations may be made to the above-described embodiments without departing from the intended spirit and scope of the present invention. Accordingly, it is intended that all such additions, deletions, modifications and alterations be included within the scope of the following claims.

What is claimed is:

1. A shock-resistant system for operatively interconnecting modules within a computer system to enable data to be transmitted and received therebetween comprising:
   a. a first module having a first media access control logic circuit for transmitting and receiving data substantially conforming to a standardized infrared communications scheme protocol;
   b. a second module having a second media access control logic circuit for transmitting and receiving data substantially conforming to said standardized infrared communications scheme protocol utilized by said first module; and
   c. a single hardwired electrical conductor signal path connecting said first and second modules to facilitate electrical bi-directional communications between said first and second media access control logic circuit only through said hardwired electrical conductor signal path;
   wherein said system comprises a multiplicity of modules, wherein each respective one of said multiplicity of modules comprises at least one dedicated transmitter element and receiver element within said module, each respective one of said multiplicity of modules being electrically interfaced to one another via said transmitter and receiver elements such that said modules are operative to transmit and receive data therebetween.

2. The system of claim 1 wherein said infrared communications scheme protocol comprises a protocol developed by the Infrared Data Association.

3. The system of claim 1 wherein said first and second modules are housed within an enclosure.

4. The system of claim 1 wherein said first and second modules are operative to run an embedded application.

5. The system of claim 1 wherein said modules comprise of at least one of an individual circuit board and a daughter card.

6. The system of claim 1 wherein the at least one transmitter element comprises a tri-stateable digital transmitter and the at least one receiver element comprises a tri-stateable digital receiver.

7. A method for operatively interconnecting modules within a computer to enable data to be transmitted and received therebetween comprising:

a. providing a first module having a first media access control logic circuit including at least one dedicated transmitter and receiver element for transmitting and receiving data substantially conforming to a standardized infrared communications scheme protocol;

b. providing a second module having a second media access control logic circuit including at least one dedicated transmitter and receiver element for transmitting and receiving data substantially conforming to a standardized infrared communications scheme protocol;

c. forming a single hardwired electrical conductor signal path solely connecting the first and second media access control logic circuits such that the first and second modules are interfaced to each other via the at least one transmitter and receiver elements, allowing the first and second modules to transmit and receive data therebetween; and d. communicating electrically between the first and second modules only through said single hardwired electrical conductor signal path bi-directionally using the standardized infrared communications scheme protocol.

8. The method of claim 7 wherein in steps a) and b), said infrared communications scheme protocol comprises a protocol developed by the Infrared Data Association.

9. The method of claim 7 wherein in steps a) and b), said first and second modules are housed within an enclosure.

10. The method of claim 7 wherein in step c), said first and second modules are operatively coupled to run an embedded application.

11. The method of claim 7 wherein the at least one transmitter element comprises a tri-stateable digital transmitter and the at least one receiver element comprises a tri-stateable digital receiver.

12. A vibration-resistant system for interconnecting modules within a computer system enabling data to be reliably transmitted and received therebetween comprising:

a. a first module having a first media access control logic circuit including a dedicated transmitter and receiver element for transmitting and receiving data conforming to a standardized infrared communications scheme protocol;

b. a second module having a second media access control logic circuit including a dedicated transmitter and receiver element for transmitting and receiving data conforming to the standardized infrared communications scheme protocol utilized by the first module; and c. a single hardwired electrical conductor signal path connecting the first and second modules to facilitate electrical bi-directional communications between the first and second media access control logic circuits, wherein the first and second modules are interfaced to each other via respective transmitter and receiver elements such that the first and second modules are operative to transmit and receive data therebetween through the single hardwired electrical conductor signal path.

13. The system of claim 12 wherein the infrared communications scheme protocol comprises a protocol developed by the Infrared Data Association.

14. The system of claim 12 wherein the first and second modules are housed within an enclosure.

15. The system of claim 12 wherein the first and second modules are operative to run an embedded application.

16. The system of claim 12 wherein the transmitter elements comprise tri-stateable digital transmitters and the receiver elements comprise tri-stateable digital receivers.

17. A vibration-resistant system for interconnecting modules within a computer system enabling data to be reliably transmitted and received therebetween comprising:

a. a first module having a first media access control logic circuit including a plurality of pairs of transmitter and receiver elements for transmitting and receiving data conforming to a standardized infrared communications scheme protocol;

b. a second module having a second media access control logic circuit including a plurality of pairs of transmitter and receiver elements for transmitting and receiving data conforming to the standardized infrared communications scheme protocol utilized by the first module; and c. a plurality of hardwired electrical conductor signal paths connecting the first and second modules, each hardwired signal path interfaced between respective pairs of transmitter and receiver elements from the first and second modules to facilitate electrical bi-directional communications between the first and second media access control logic circuits;

wherein the plurality of hardwired electrical conductor signal paths and respective pairs of transmitter and receiver elements from the first and second modules provide a plurality of redundant data links between the first and second modules such, that the modules are operative to transmit and receive data therebetween when a failure occurs in one of the plurality of redundant data links.

18. The system of claim 17 wherein the transmitter elements comprise tri-stateable digital transmitters and the receiver elements comprise tri-stateable digital receivers.

19. A method for interconnecting modules within a computer in a redundant manner enabling data to be reliably transmitted and received therebetween comprising:

a. providing a first module having a first media access control logic circuit including a plurality of pairs of transmitter and receiver elements for transmitting and receiving data conforming to a standardized infrared communications scheme protocol;

b. providing a second module having a second media access control logic circuit including a plurality of pairs of transmitter and receiver elements for transmitting and receiving data conforming to the standardized infrared communications scheme protocol utilized by the first module;

c. providing a plurality of hardwired electrical conductor signal paths connecting the first and second modules, each hardwired signal path interfaced between respective pairs of transmitter and receiver elements from the first and second modules to facilitate electrical bi-directional communications between the first and second media access control logic circuit; and d. communicating electrically between the first and second modules through one of the plurality of hardwired electrical conductor signal paths bi-directionally using the standardized infrared communications scheme protocol;

wherein the plurality of hardwired electrical conductor signal paths and respective pairs of transmitter and receiver elements from the first and second modules provide a plurality of redundant data links between the first and second modules such that the modules are operative to transmit and receive data therebetween when a failure occurs in one of the plurality of redundant data links.

20. The method of claim 19 wherein the transmitter elements comprise tri-stateable digital transmitters and the receiver elements comprise tri-stateable digital receivers.

* * * * *